(12) United States Patent
Danforth et al.

(10) Patent No.: US 10,247,530 B2
(45) Date of Patent: Apr. 2, 2019

(54) PROJECTILE WITH SINGLE-PIECE MAIN BODY

(71) Applicant: Raytheon Company, Waltham, MA (US)

(72) Inventors: Jeremy C. Danforth, Tucson, AZ (US); Matthew H. Summers, Marana, AZ (US); David G. Garrett, Tucson, AZ (US); Stephen M. Bagg, Boston, MA (US)

(73) Assignee: Raytheon Company, Waltham, MA (US)

( * ) Notice: Subject to any disclaimer, the term of this patent is extended or adjusted under 35 U.S.C. 154(b) by 428 days.

(21) Appl. No.: 15/217,482

(22) Filed: Jul. 22, 2016

(65) Prior Publication Data

US 2018/0073842 A1    Mar. 15, 2018

(51) Int. Cl.
| | |
|---|---|
| *F42B 10/66* | (2006.01) |
| *B33Y 80/00* | (2015.01) |
| *F02K 9/97* | (2006.01) |
| *F02K 9/42* | (2006.01) |
| *F42B 6/00* | (2006.01) |
| *F42B 10/00* | (2006.01) |

(52) U.S. Cl.
CPC ............ *F42B 10/661* (2013.01); *B33Y 80/00* (2014.12); *F02K 9/425* (2013.01); *F02K 9/97* (2013.01); *F42B 6/006* (2013.01)

(58) Field of Classification Search
CPC ... F02K 9/97; F02K 9/425; F02K 9/10; B33Y 80/00; F42B 10/661; F42B 6/006; F42B 10/663; F42B 15/00
See application file for complete search history.

(56) References Cited

U.S. PATENT DOCUMENTS

| | | | | |
|---|---|---|---|---|
| 2,892,409 | A | * | 6/1959 | Lyon ...................... F42B 15/00 |
| 3,034,434 | A | * | 5/1962 | Swaim et al. ......... F42B 10/661 |
| 3,899,953 | A | * | 8/1975 | Labruyere ............... F42B 15/00 |

(Continued)

FOREIGN PATENT DOCUMENTS

WO    2013/141929 A2    9/2013

OTHER PUBLICATIONS

International Search Report and the Written Opinion of the International Search Authority for corresponding International Application No. PCT/US2017/021804 dated Nov. 17, 2017.

*Primary Examiner* — Bernarr E Gregory

(74) *Attorney, Agent, or Firm* — Renner, Otto, Boisselle & Sklar, LLP

(57) ABSTRACT

A projectile, such as a railgun-launched projectile, includes a single-piece body that is additively manufactured. The single piece body includes fuel within it, and one or more cavities for receiving an oxidizer. The body also defines one or more combustion chambers therein for combustion of the fuel and oxidizer as part of a divert thruster system. Thus the projectile is able to fully contain the divert thruster system within the single-piece body without using any hot gas seals as part of the system. The body may also define a cavity for receiving a pressurized fluid, used as part of a cold-gas attitude control system of the projectile. The body may also define passages between the pressurized fluid cavity and other parts of the attitude control system, such as valves and/or nozzles that are outside of the body, for example being aft of the one-piece body.

19 Claims, 3 Drawing Sheets

(56) References Cited

U.S. PATENT DOCUMENTS

| | | | |
|---|---|---|---|
| 4,578,947 A * | 4/1986 | Hodges, Jr. et al. | F02K 9/10 |
| 7,966,809 B2 * | 6/2011 | Benson | F02K 9/10 |
| 2004/0245371 A1 * | 12/2004 | Fujita et al. | F42B 10/663 |
| 2005/0235862 A1 | 10/2005 | Gousman et al. | |
| 2006/0059888 A1 | 3/2006 | Maier | |
| 2011/0094372 A1 | 4/2011 | Carlson | |
| 2012/0060468 A1 | 3/2012 | Dushku et al. | |
| 2013/0319212 A1 | 12/2013 | Hunter et al. | |

* cited by examiner

PROJECTILE WITH SINGLE-PIECE MAIN BODY

BACKGROUND OF THE INVENTION

Field of the Invention

The invention is in the field of projectiles.

Description of the Related Art

Projectiles fired from certain high-speed launchers, such as railguns, endure much greater accelerations than projectiles fired using explosives. The greater accelerations put additional strains on the projectiles.

Projectiles can often need course corrections during flight, such as to hit a moving target (such as a flight vehicle) that may itself be changing course, such as in an attempt to avoid the projectile. Thruster systems for making such course corrections involve numerous parts that may be difficult to fit together accurately.

SUMMARY OF THE INVENTION

An unpowered projectile has a single-piece additively manufactured main body.

A projectile has a single-piece body that houses a divert thruster system, which operates without hot-gas seals.

According to an aspect of the invention, a projectile includes: a one-piece body; a divert thruster system; and an attitude control system; wherein the attitude control system includes a pressurized fluid in a cavity defined the body; wherein the divert thruster system includes fuel, and an oxidizer in one or more cavities defined by the body; and wherein the body defines one or more combustion cavities for combustion of the fuel and the oxidizer.

According to an embodiment of any paragraph(s) of this summary, the body is additively manufactured.

According to an embodiment of any paragraph(s) of this summary, the body is made of plastic.

According to an embodiment of any paragraph(s) of this summary, the body is made of a metal.

According to an embodiment of any paragraph(s) of this summary, the fuel is part of the body.

According to an embodiment of any paragraph(s) of this summary, the fuel is in one or more cavities defined by the body.

According to an embodiment of any paragraph(s) of this summary, the fuel and the body are different materials.

According to an embodiment of any paragraph(s) of this summary, the fuel is additively manufactured along with the body.

According to an embodiment of any paragraph(s) of this summary, the fuel is a separate insert inserted into the body during additive manufacture of the body.

According to an embodiment of any paragraph(s) of this summary, the fuel includes multiple fuel segments and multiple respective oxidizer charges, for providing multiple divert thrusts.

According to an embodiment of any paragraph(s) of this summary, the body includes pads.

According to an embodiment of any paragraph(s) of this summary, the attitude control system includes valves and/or nozzles hooked up to the pads.

According to an embodiment of any paragraph(s) of this summary, the body defines one or more passages connecting the cavity to components of the attitude control system that are external to the body.

According to an embodiment of any paragraph(s) of this summary, the components of the attitude control system that are external to the body, are aft of the body.

According to an embodiment of any paragraph(s) of this summary, the divert thruster system includes one or more nozzle inserts in the body.

According to an embodiment of any paragraph(s) of this summary, the one or more nozzle inserts are made of ceramic.

According to an embodiment of any paragraph(s) of this summary, the divert thruster system further includes one or more igniters.

According to an embodiment of any paragraph(s) of this summary, the oxidizer and the pressurized fluid are both the same fluid.

According to an embodiment of any paragraph(s) of this summary, the oxidizer and the pressurized fluid are both nitrous oxide.

According to an embodiment of any paragraph(s) of this summary, the projectile is a rail gun projectile.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A projectile includes a single-piece body that is additively manufactured. The single piece body includes fuel within it, and one or more cavities for receiving an oxidizer. The body also defines one or more combustion chambers therein for combustion of the fuel and oxidizer as part of a divert thruster system. Thus the projectile is able to fully contain the divert thruster system within the single-piece body without using any hot gas seals as part of the system. The body may also define a cavity for receiving a pressurized fluid, used as part of a cold-gas attitude control system of the projectile. The body may also define passages between the pressurized fluid cavity and other parts of the attitude control system, such as valves and/or nozzles that are outside of the body, for example being aft of the one-piece body. The projectile may be a railgun-launched projectile that encounters a high degree of acceleration during launch. The divert thruster system and the attitude control system may be used for course change and/or correction during flight, for example to impact a flight vehicle as a target. The use of the single-piece body may provide advantages over multiple-piece bodies, such as increased rigidity of the structure, a large reduction in the number seals (including perhaps a complete elimination of the need for hot-gas seals), and a reduction in thrust misalignment. In addition, the single-piece body may be made out of a material that is not electrically conductive, such as a polymer or plastic, which may provide an advantage for certain applications, such as for a projectile launched by a rail gun.

Figure 1:
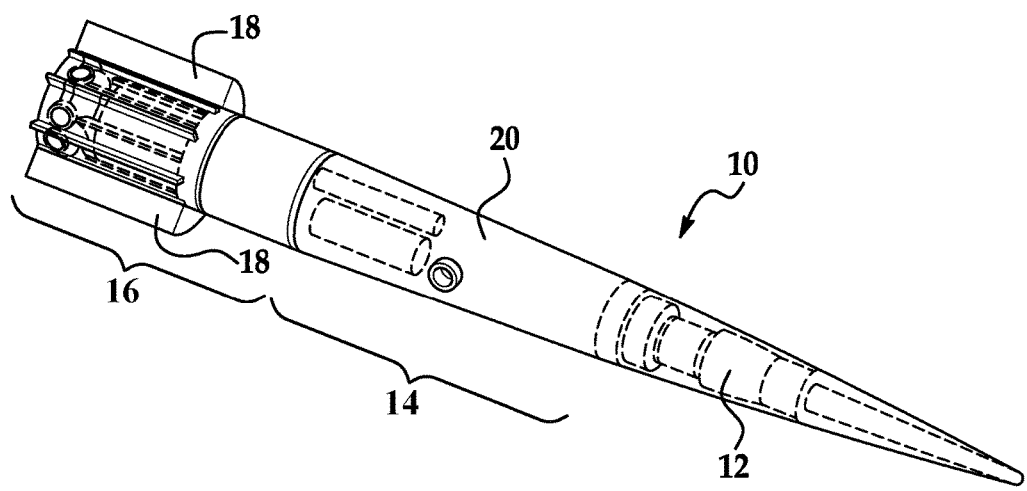
FIG. 1 is an oblique, partially-see-through view of a projectile according to an embodiment of the present invention.

FIG. 1 shows a projectile 10 that is launched from a launcher such a railgun (not shown). The projectile includes a forward payload section 12; a divert thruster system (DTS) 14 in its middle, aft of the payload section 12; and an attitude control system (ACS) 16 at the back end of the projectile 10. The projectile 10 is an unpowered projectile, in that it does not have a main thrust system, but relies on momentum imparted to it from the launcher. A series of fins 18 are also located at the back end of the projectile 10. The fins 18 are used to aid in stabilizing flight. The payload section 12 may include a sensor, such as an optical sensor, to aid in guiding the projectile 10 to a target or other intended destination; a warhead; a controller that is operatively coupled to the divert thruster system 14 and/or the attitude control system 16 in order to control operation of DTS 14 and/or the ACS 16; and/or a communication system, such as a radio receiver and/or transmitter for communicating with devices and/or systems that are external to the projectile 10. A communication system may be used for the projectile 10 to report its position to a guidance system and/or other external device, and/or to receive commands and/or data for correcting course of the projectile 10. The controller, for example a computer and/or hardware and/or software, may be used to control the timing of firing and/or otherwise actuating and/or controlling the various components of the DTS 14 and/or the ACS 16, such as as discussed further below.

A single-piece body 20 extends through much of the middle portion of the projectile 10. In the illustrated embodiment the body 20 houses all of the DTS 14 and some components of the ACS 16. As discussed in greater detail below, the single-piece body 20 may be manufactured using any of a variety of additive manufacturing processes, processes in which a part is built up layer by layer (or portion by portion) by adding material. This contrasts with conventional subtractive manufacturing, in which material is removed, such as by machining. In the illustrated embodiment the single-piece body 20 is coupled at its front end to the payload section 12, and at its aft end to a portion of the ACS 16. However the body 20 alternatively may have a greater or lesser extent (such as length) than in the illustrated embodiment.

Figure 2:
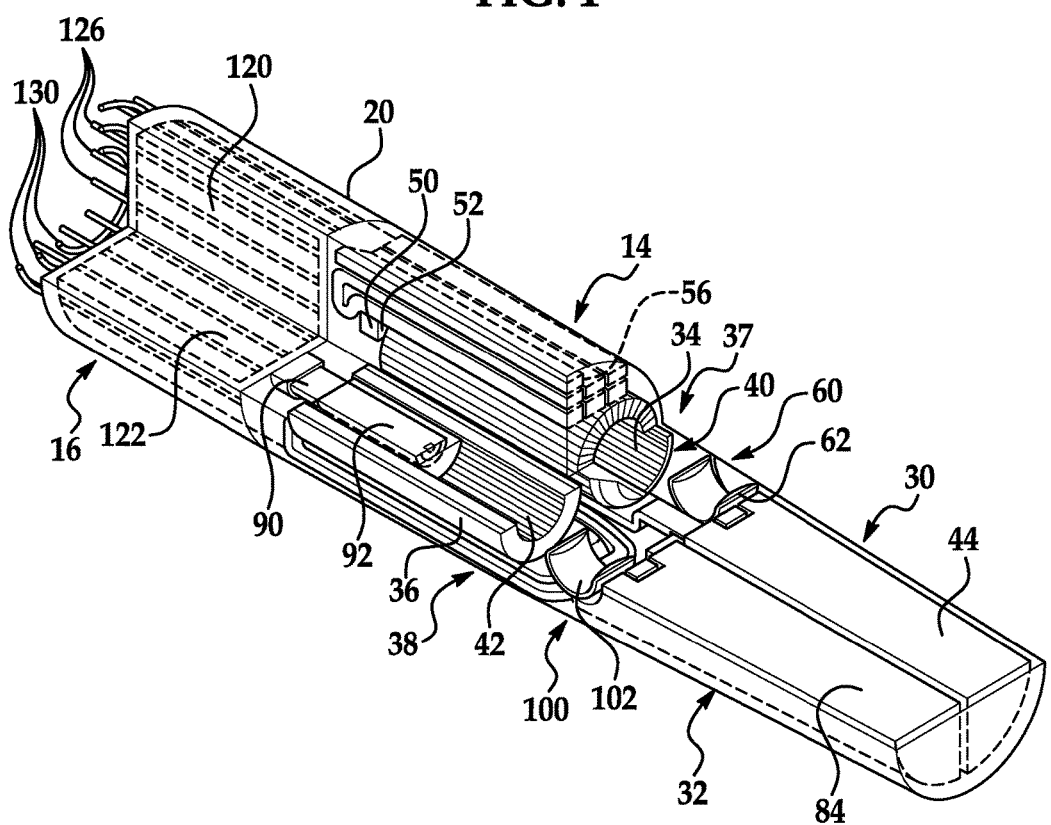
FIG. 2 is a partially-cutaway view of the body and associated components of the projectile of FIG. 1.

With reference now to FIG. 2, in the illustrated embodiment the body 20 defines a pair of oxidizer tanks 30 and 32, and a pair of fuel segments 34 and 36 all of which are parts of the DTS 14. The oxidizer tank 30 and the fuel segment 34 are parts of a first thruster 37, and the oxidizer tank 32 and the fuel segment 36 are parts of a second thruster 38.

The body 20 also defines a pair of combustion chambers 40 and 42. The combustion chamber 40 is where combustion occurs between the fuel 34, and oxidizer 44 from the oxidizer tank 30. This combustion is initiated and controlled by a valve 50 and an igniter and valve driver 52. The valve 50 controls flow of the oxidizer 44 through an oxidizer flow passage 56 in the body 20 that connects the oxidizer tank 30 and the valve 50. The flow passage 56 may be configured to help maintain a desired mass balance in the projectile 10 (FIG. 1) by controlling the placement of the oxidizer material 44.

The igniter/valve driver 52 controls the valve 50, and ignites the fuel-oxidizer mixture when needed. The fuel-oxidizer combustion occurs in the combustion chamber 40, and the pressurized gases produced by the combustion pass out of the projectile 10 through a passage 60 that forms an opening. In doing so the pressurized combustion products pass through a nozzle 62. The flow passage 56 and the externally-opened passage 60 are defined by the body 20. The nozzle 62 may have a suitable shape, such as a converge-diverge shape, to increase the thrust output. The nozzle 62 may be made of a suitable material for directing hot combustion products, for example being made of a suitable ceramic material. The nozzle 62 may be an insert that is placed in a suitable location as the body 20 is built up, with the body 20 built up around the nozzle 62 to hold the nozzle 62 in place.

There are similar parts/features for the second thruster 38. The second thruster 38 includes and/or makes use of an oxidizer 84 that flows through a flow passage (not shown in FIG. 2) in the body 20. Flow of the oxidizer 84 is controlled by the valve 90, and the valve 90 is controlled by the igniter/valve driver 92. The igniter/valve driver 92 also controls initiation (ignition) of the fuel/oxidizer combustion, and the combustion products pass through an outlet passage 100 that includes a nozzle 102.

The fuel pieces 34 and 36 may have any of a variety of suitable configurations. For example the fuel segments 34 and 36 may be cylindrical, with openings along their central axes for flow of the oxidizer and the combustion gas products. The central open space surrounded by the fuel segments 34 and 36 is where the combustion occurs, with the fuel segments 34 and 36 in the combustion chambers 40 and 42. Thus the central axes of the fuel segments 34 and 36 may be the same as the central axes of the combustion chambers 40 and 42, in which the fuel pieces 34 and 36 are located. Although the fuel segments 34 and 36 may have a generally annular cross section shape, the fuel segments 34 and 36 may have notches or other features on their radially inner surfaces, in order to enhance the combustion between the fuel and the oxidizer.

The thrusters 37 and 38 provide separately actuatable to provide predetermined amounts of thrust, at different times. The thrusters 37 and 38 are substantially identical to each other in their configurations and the amount of thrust that they provide. Alternatively the thrusters 37 and 38 may provide different amounts of thrust, or otherwise may be different in their configurations.

The valves 50 and 90 may be pyrotechnic valves that are opened up by the firing of the igniters/valve drivers 52 and 92. The firing of the pyrotechnics of the igniters/drivers 52 and 92 also ignites the oxidizer/fuel mixture caused by the oxidizer 44 and 84 passing through the valves 50 and 90. In operation hot gas output from the firing of the igniters 52 and 92 heats fuel material from solid to hot gas state. As the igniters 52 and 92 burn out, one or more pistons is/are allowed to translate and in doing so un-ports the injector orifices that meter the proper oxidizer flow through the valves 50 and 90. As oxidizer makes contact with the now hot and gaseous fuel, combustion is initiated and then sustained.

The outlet passages 60 and 100 may be configured such that the thrust from the thrusters 37 and 38 is aligned with a center of mass of the projectile 10, with the vectors for the thruster from the thrusters 60 and 100 passing through (of very close to) the center of mass. With this arrangement the firing of the thrusters 37 and 38 produces a pure (or close to pure) translational acceleration of the projectile 10—no significant change of attitude, such as tipping or rolling, is caused by the firing of the divert thrusters 37 and 38. The additive manufacture of the body 20 aids in proper placement of the outlet passages 60 and 100 to avoid thrust misalignment that produces undesired moments on the projectile 10. The use of the single-piece additively-manufactured body 20 avoids the need for parts added onto a fuselage, which would produce inaccuracies in thrust locations, for example due to tolerances in the placement of thruster component parts relative to a separate fuselage or body.

Another benefit of the single-piece body 20 is in the avoidance of the need for hot-gas seals between separate components. All of the fluid flow passages in the DTS 14 are part of the single-piece body 20. In particular the body 20 includes the flow passages where combustion occurs and where combustion products flow. Eliminating the need for hot-gas seals avoids extra parts, reduces the expense involved in such seals, and eliminates hot-gas seals as a possible failure point.

In addition to enclosing all of the main parts of the DTS 14, the body 20 in the illustrated embodiment defines a cold gas pressure tank 120, which is part of the ACS 16. The tank 120 is filled with a pressurized gas 122 that is used as part of the ACS 16. The body 20 has one or more flow passages 126 leading aft from the cold gas pressure tank 120, to connect to other components of the ACS 16, such as attitude control valves and nozzles.

The tanks 30, 32, and/or 120 may have structural features, such as interior ribs extending in a circumferential direction around an inner surface of a tank, that improve the structural integrity of the tanks 30, 32, and/or 120. The ribs or other structural features may be additively manufactured as integral parts of the body 20, as part of the process of additively manufacturing the body 20.

Figure 3:
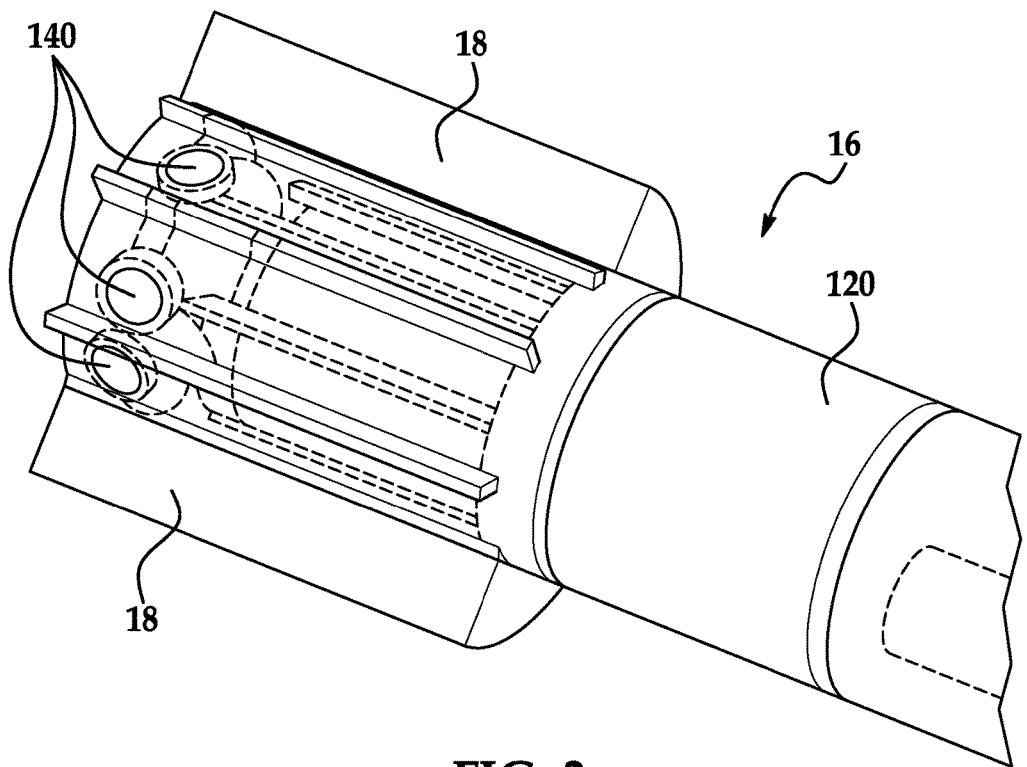
FIG. 3 is an oblique, partially-see-through view of the attitude control system of the projectile of FIG. 1.

The body 20 also has a series of pads 130 for mounting aft components of the ACS 16, either individually or as part of a larger structure. The pads 130 may be made of resilient material that allow sealing where components are mounted onto the body 20. Referring to FIG. 3, the ACS 16 includes a series of attitude control thrusters 140 that are coupled to respective of the flow passages 126 leading out from the cold gas pressure tank 120. Valves for the thrusters 140 may be connected to respective of the passages 126, as well as to passages leading to the thrusters 140.

The thrusters 140 may include suitable components for producing thrust as desired for attitude control of the projectile 10 (FIG. 1). For example the thrusters 140 may each include valving and/or nozzles for controlling thrust generation and for enhancing thrust out of the attitude control thrusters 140. Also the thrusters 140 may include one or more heated catalysts for decomposing the cold gas prior to expelling it from the projectile 10, to enhance the thrust production. Thus the thrusters 140 may be cold gas thrusters (directly expelling cold gas from the tank 120) or may be warm gas thrusters (passing the pressurized cold gas 122 first through a heated catalyst). For example, an oxidizer such as NOX (nitrous oxide) or a monopropellant like HAN (hydroxylammonium nitrate) may be used, with a catalyst that would allow for warm gas operation. Alternatively a heating element may be used to raise the temp of an inert gas such as nitrogen or helium. Also refrigerants such as halo-carbon gases have been used for improved warm gas performance. Control may be accomplished by taking commands from an autopilot loop, which would give demand signals to a controller that converted autopilot demand to valve opening commands in the case of the ACS. Feedback to the control system via rate sensors/accelerometers would then modify the demand signal (valve duty cycle for instance) until the error between current and desired state is brought to zero.

Figure 4:
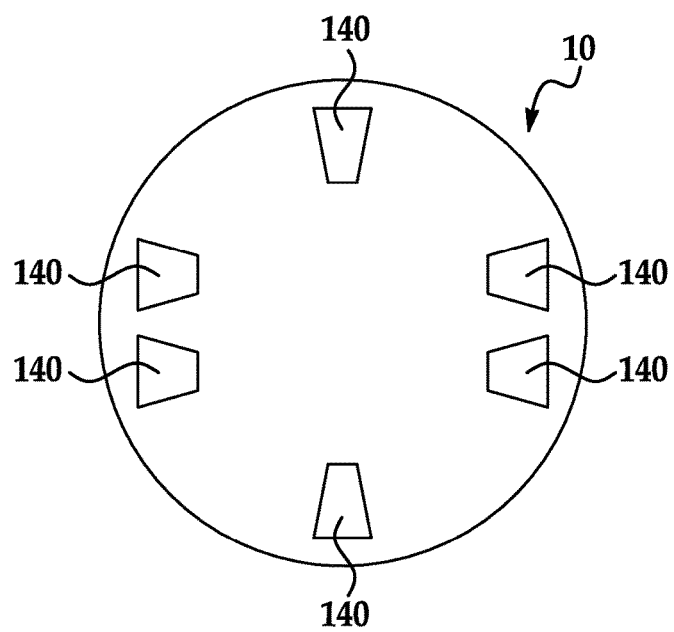
FIG. 4 is a schematic view showing one possible arrangement for the attitude control thrusters of the attitude control system of FIG. 3.

With reference now to FIG. 4, there may be a suitable number of the thrusters 140 to accomplish the desired control of the attitude of the projectile 10 (FIG. 1). In the illustrated embodiment there are six of the attitude control thrusters 140, which may be selectively actuated in various combinations to accomplish desired roll, pitch, and/or yaw attitude changes. Other suitable numbers of thrusters alternatively may be used.

A controller (not shown) may be used to control the opening and closing of valving of the attitude control thrusters 140 to position the projectile 10 (FIG. 1) as desired. The control of the thrusters 140 may be integrated with the control of the divert thrusters 37 and 38 (FIG. 2), for example to position the projectile 10 in a desired attitude prior to firing one the divert thrusters 37 and 38, to achieve a divert thruster course correction in a desired direction.

The body 20 may be made out of any of a variety of suitable materials, materials that can be additively manufactured. Such materials include suitable plastics and metals. An example of a suitable plastic material is nylon.

The fuel segments 30 and 32 may be made of any of a variety of suitable combustible materials. One example of a suitable fuel is acrylonitrile butadiene styrene (ABS) thermoplastic, although many other plastic and non-plastic materials are possible alternatives. In one embodiment the body 20 and the fuel segments 30 and 32 are made of different materials, with the both the fuel material and the body material being built up during the same additive manufacturing process. In another embodiment the body 20 and the fuel segments 30 and 32 are different materials, with the fuel segment's 30 and 32 formed separately, and inserted into the body 20 at appropriate locations during additive manufacture of the body 20.

In another embodiment the body 20 is made of a burnable material, such as a suitable thermoplastic, which itself acts as the fuel. In such an arrangement there may be no clear demarcation between the fuel segments 30 and 32, and other portions of the body 20. The amount of body/fuel that is burned in such an embodiment during the firing of the divert thrusters 37 and 38 may be controlled by the amount of the oxidizer that is present in the oxidizer tanks 34 and 36. As a further alternative, the fuel segments 30 and 32 may be made of a different burnable material than the body 20 or other parts of the body 20, with the firing of the divert thrusters 37 and 38 also consuming some parts of the body 20 (as well as some or all of the fuel segments 30 and 32).

The oxidizer material may be any of a variety of suitable oxidizer material. Examples include nitrous oxide ($N_2O$) and liquid oxygen. Other possible oxidizers include HAN (hydroxylammonium nitrate) and hydrogen peroxide. The oxidizer may be poured into the tanks 34 and 36 after formation of the body 20. The filling/pouring may be accomplished through fill ports (not shown) that are in the body 20.

The pressurized cold gas 122 in the tank 120 may be any of a variety of suitable gases. In one embodiment the cold gas 122 is nitrous oxide, although there is no requirement or particular benefit to using the same fluid for the oxidizer 44 and 84, and the cold gas 122. Desirable properties of the cold gas 122 are stability in storage, being able to self-pressurize regularly from a liquid to a gas, and (for a warm-gas embodiment) the ability to decompose by use of suitable catalyst. Other possible cold gases include nitrogen, helium, and refrigerants such as halocarbon gases.

Figure 5:
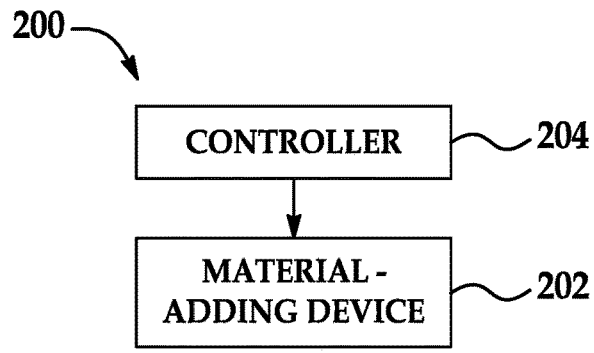
FIG. 5 is a block diagram showing arrangement of a system for producing the body of FIG. 2.

Turning now to FIG. 5, a system 200 is shown for producing the single-piece body 20 (FIG. 1). Material is added to the body 20 by a selective material-adding device 202, which is controlled by a controller 204. The material may be formed layer by layer. One way of doing so is by extruding material, such as by extrusion of material from one or more extrusion heads. The controller 204 may be a computer with software and/or hardware use to control positioning of extruder heads relative to a bed or other platform upon which the body 20 is being built, and when material is dispensed. The controller 204 may include or may be able to access data regarding the desired configuration of the body (where material is to be placed, and the composition of what material is to be place, when the additive manufacturing involves more than one material). Other suitable operations, such as pre-heating of material and curing, may be used in forming the body 20. All or portions of the operation may be performed in a controlled environment, such as in a heated chamber. Additive manufacturing has the advantage of minimizing joints and/or seals, but injection molding is a possible alternative way of making some or all of the body 20. Manufacturing may be carried out to provide adequate properties to the body 20, for example controlling density (percentage of infill of the material, for example) and/or the number of shells or layers of material to provide adequate hoop strength to the body 20 and/or to provide a good pressure seal.

Other additive manufacturing or three-dimensional printing methods may be usable as alternatives to the extrusion process described in the previous paragraph. Such additive manufacturing processes are not limited to layerwise deposition, and may include other methods, such as, but not limited to: Selective Laser Sintering (SLS), Stereolithography (SLA), micro-stereolithography, Fused Deposition Modeling (FDM), and micro-dispense. Areas of overlap can exist between many of these methods, which can be chosen as needed based on the materials, tolerances, size, quantity, accuracy, cost structure, critical dimensions, and other parameters defined by the requirements of the object or objects to be made.

Figure 6:
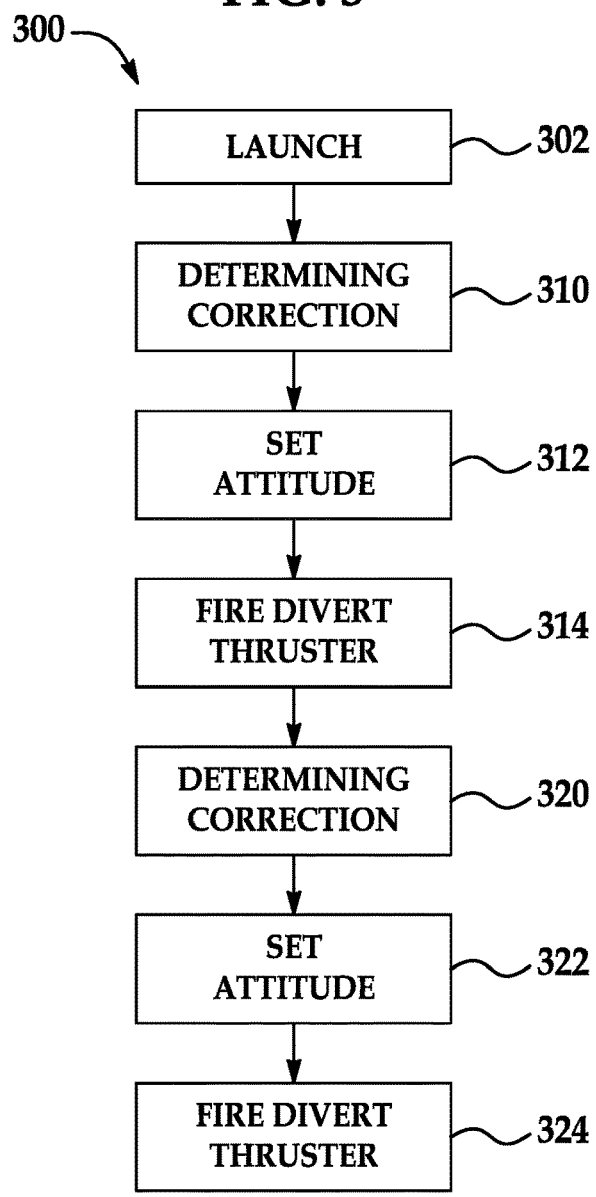
FIG. 6 is a high-level flowchart illustrating operation of the projectile of FIG. 1.

Referring now to FIG. 6, a method 300 is shown for flying the projectile 10 (FIG. 1) toward a target or desired destination. In step 302 the projectile 10 is launched, such as by use of a rail gun. Alternative ways of launching include as a standard projectile (launched by a powder charge) or as a rocket-assisted projectile.

A midcourse correction is performed in steps 310, 312, and 314. The course corrections are performed using one of the divert thrusters 37 and 38 (FIG. 2). A controller (not shown), such as a flight computer in the payload section 12 (FIG. 1), makes a determination in step 310 of the need for and timing for a course correction. The controller may use data from onboard systems, such as a sensor in the payload section 12, and/or may receive data and/or instructions from a remote system, such as a ground-based or air-based guidance system, for example relying on data from tracking of the projectile 10 and/or a target (which may be a flying target as opposed to a target or destination at a predetermined (relatively) fixed location). Once the determination is made as to when the midcourse correction divert thruster is to be fired, in step 312 the attitude is set using the ACS 16 (FIG. 1), and in step 314 one of the thrusters from the DTS 14 (FIG. 1) is fired.

A second (final) course correction may be performed in steps 320, 322, and 324, to divert the course of the projectile 10 (FIG. 1) if necessary as the projectile 10 approaches the target (or other destination). The procedure is similar to that for the first course correction: the controller makes a determination of the timing and attitude for the divert thruster firing in step 320; the attitude is set by the ACS 16 (FIG. 1) in step 322; and a divert thruster of the DTS 14 (FIG. 1) is fired in step 324.

The projectile 10 (FIG. 1), and in particular its single-piece body 20 (FIG. 2), provide many advantages, as discussed above. The body 20 is robust structurally, allows reduced thrust misalignment, and greater reduces the number of seals in the system, including possibly completely eliminating hot-gas seals. The body 20 also allows for repeatable and precise manufacture, with the additive manufacturing process enabling production of complicated shapes that would be difficult or impossible to produce using other manufacturing techniques.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A projectile comprising:
   a one-piece body;
   a divert thruster system; and
   an attitude control system;
   wherein the attitude control system includes a pressurized fluid in a pressurized fluid cavity defined by the body;
   wherein the divert thruster system includes fuel, and an oxidizer in one or more additional cavities defined by the body;
   wherein the body defines one or more combustion cavities for combustion of the fuel and the oxidizer;
   wherein the body defines one or more passages connecting the pressurized fluid cavity to components of the attitude control system that are external to the body, aft of the body;
   wherein the attitude control system includes attitude control thrusters that are external to the body; and
   wherein the attitude control thrusters are cold gas thrusters or warm gas thrusters.

2. The projectile of claim 1, wherein the body is additively manufactured.

3. The projectile of claim 1, wherein the body is made of plastic.

4. The projectile of claim 1, wherein the body is made of a metal.

5. The projectile of claim 1, wherein the fuel is part of the body.

6. The projectile of claim 1, wherein the fuel is in one or more fuel cavities defined by the body.

7. The projectile of claim 6, wherein the fuel and the body are different materials.

8. The projectile of claim 6, wherein the fuel is additively manufactured along with the body.

9. The projectile of claim 6, wherein the fuel is a separate insert inserted into the body during additive manufacture of the body.

10. The projectile of claim 1, wherein the fuel includes multiple fuel segments and multiple respective oxidizer charges, for providing multiple divert thrusts.

11. The projectile of claim 1,
wherein the body includes pads; and
wherein the attitude control system includes valves and/or nozzles hooked up to the pads.

12. The projectile of claim 1, wherein the divert thruster system includes one or more nozzle inserts in the body.

13. The projectile of claim 12, wherein the one or more nozzle inserts are made of ceramic.

14. The projectile of claim 1, wherein the divert thruster system further includes one or more igniters.

15. The projectile of claim 1, wherein the oxidizer and the pressurized fluid are both the same fluid.

16. The projectile of claim 15, wherein the oxidizer and the pressurized fluid are both nitrous oxide.

17. The projectile of claim 1, wherein the projectile is a rail gun projectile.

18. The projectile of claim 1, wherein the attitude control thrusters are cold gas thrusters that directly expelled the pressurized fluid.

19. The projectile of claim 1, wherein the attitude control thrusters are warm gas thrusters that pass the pressurized fluid through a heated catalyst before expelling the pressurized fluid.

* * * * *